United States Patent
Fritze et al.

(10) Patent No.: US 10,992,031 B2
(45) Date of Patent: Apr. 27, 2021

(54) MOBILE COMMUNICATIONS ANTENNA FOR MOUNTING ON A MAST OR WALL-LIKE SUPPORT WITH AT LEAST TWO INTERCHANGEABLE AMPLIFIER MODULES

(71) Applicant: Telefonaktiebolaget LM Ericsson (publ), Stockholm (SE)

(72) Inventors: Stefan Fritze, Rosenheim (DE); Roland Gabriel, Griesstätt (DE); Maximilian Göttl, Frasdorf (DE); Maximilian Obermayer, Rosenheim (DE); Stefan Weber, Söchtenau (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 16/316,825

(22) PCT Filed: Jul. 6, 2017

(86) PCT No.: PCT/EP2017/067030
§ 371 (c)(1),
(2) Date: Jan. 10, 2019

(87) PCT Pub. No.: WO2018/011065
PCT Pub. Date: Jan. 18, 2018

(65) Prior Publication Data
US 2019/0312339 A1    Oct. 10, 2019

(30) Foreign Application Priority Data
Jul. 11, 2016    (DE) .................... 10 2016 112 701.9

(51) Int. Cl.
*H01Q 1/24*    (2006.01)
*H01Q 1/12*    (2006.01)
(Continued)

(52) U.S. Cl.
CPC ............... *H01Q 1/247* (2013.01); *H01Q 1/02* (2013.01); *H01Q 1/1221* (2013.01);
(Continued)

(58) Field of Classification Search
None
See application file for complete search history.

(56) References Cited

U.S. PATENT DOCUMENTS

2011/0032158 A1    2/2011    Rodger et al.
2011/0133905 A1*   6/2011    Hussain ............ G06K 7/10366
                                                   340/10.42

(Continued)

FOREIGN PATENT DOCUMENTS

CN    2273931 Y    2/1998
CN    201466222    5/2010
(Continued)

OTHER PUBLICATIONS

English translation of the International Preliminary Report on Patentability and Written Opinion of the International Searching Authority dated Jan. 24, 2019, issued in International Application No. PCT/EP2017/067030, 9 pages.

(Continued)

*Primary Examiner* — Mohammed Rachedine
(74) *Attorney, Agent, or Firm* — Sage Patent Group

(57) ABSTRACT

A mobile communications antenna comprises at least one antenna housing with a housing front side, a housing rear side, a first lateral housing side and a second lateral housing side opposite to the first. In the antenna housing, there are multiple radiating elements or pairs of radiating elements. The antenna further includes at least two amplifier modules, wherein each amplifier module comprises a first connection port and a second connection port and the amplifier modules are mounted on the exterior of the antenna housing. The (Continued)

connection ports are connected to corresponding first and second connection contact devices via plug-in connections. At least one signal processing and/or control unit is disposed in a housing, which is separate from the amplifier modules, in or on the antenna housing of the mobile communications antenna. The at least one signal processing and/or control unit comprises at least one digital interface to a baseband unit or to the mobile communication network and interfaces to the separate amplifier modules.

19 Claims, 12 Drawing Sheets

(51) Int. Cl.
| | | |
|---|---|---|
| *H01Q 1/02* | (2006.01) | |
| *H01Q 3/36* | (2006.01) | |
| *H04B 1/38* | (2015.01) | |
| *H04B 1/00* | (2006.01) | |
| *H04B 1/3888* | (2015.01) | |
| *H04L 25/02* | (2006.01) | |
| *H04W 24/00* | (2009.01) | |

(52) U.S. Cl.
CPC ......... *H01Q 1/1228* (2013.01); *H01Q 1/1242* (2013.01); *H01Q 1/246* (2013.01); *H01Q 3/36* (2013.01); *H04B 1/0064* (2013.01); *H04B 1/38* (2013.01); *H04L 25/0266* (2013.01); *H04L 25/0272* (2013.01); *H04W 24/00* (2013.01); *H04B 1/3888* (2013.01)

(56) References Cited

U.S. PATENT DOCUMENTS

| | | | | |
|---|---|---|---|---|
| 2012/0044054 | A1* | 2/2012 | Hussain | ................... G06F 19/00 340/10.1 |
| 2014/0035731 | A1* | 2/2014 | Chan | ................... G06K 7/10356 340/10.3 |
| 2015/0122886 | A1* | 5/2015 | Koch | ................... H01Q 9/0407 235/440 |
| 2017/0116443 | A1* | 4/2017 | Bolic | ...................... H02J 50/90 |

FOREIGN PATENT DOCUMENTS

| | | | |
|---|---|---|---|
| CN | 102696150 | A | 9/2012 |
| CN | 103682673 | A | 3/2014 |
| CN | 203775285 | U * | 8/2014 |
| DE | 10 2012 011 892 | | 12/2013 |
| DE | 10 2014 000 964 | | 7/2015 |
| EP | 3 073 564 | | 9/2016 |
| JP | 2014016233 | A | 1/2014 |
| WO | 2009022952 | A1 | 2/2009 |
| WO | 2013/096880 | | 6/2013 |
| WO | 2015/072727 | | 5/2015 |
| WO | 2015/105351 | | 7/2015 |
| WO | 2015/126106 | | 8/2015 |
| WO | 2016/054392 | | 4/2016 |
| WO | 2016/060305 | | 4/2016 |

OTHER PUBLICATIONS

International Search Report and Written Opinion of the ISA for PCT/EP2017/067030 dated Oct. 26, 2017, 13 pages.
Office Action dated Aug. 5, 2020 for Chinese Patent Application No. 201780042657.6, 8 pages.

* cited by examiner

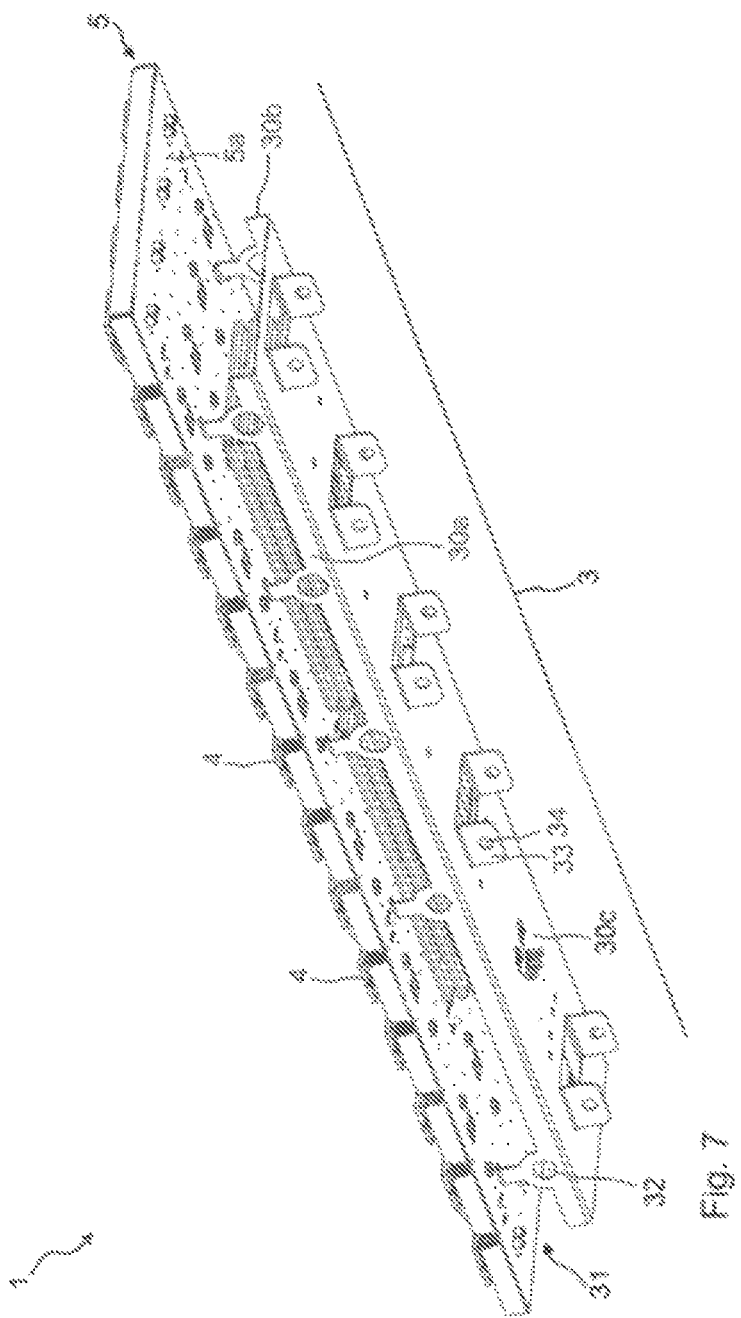

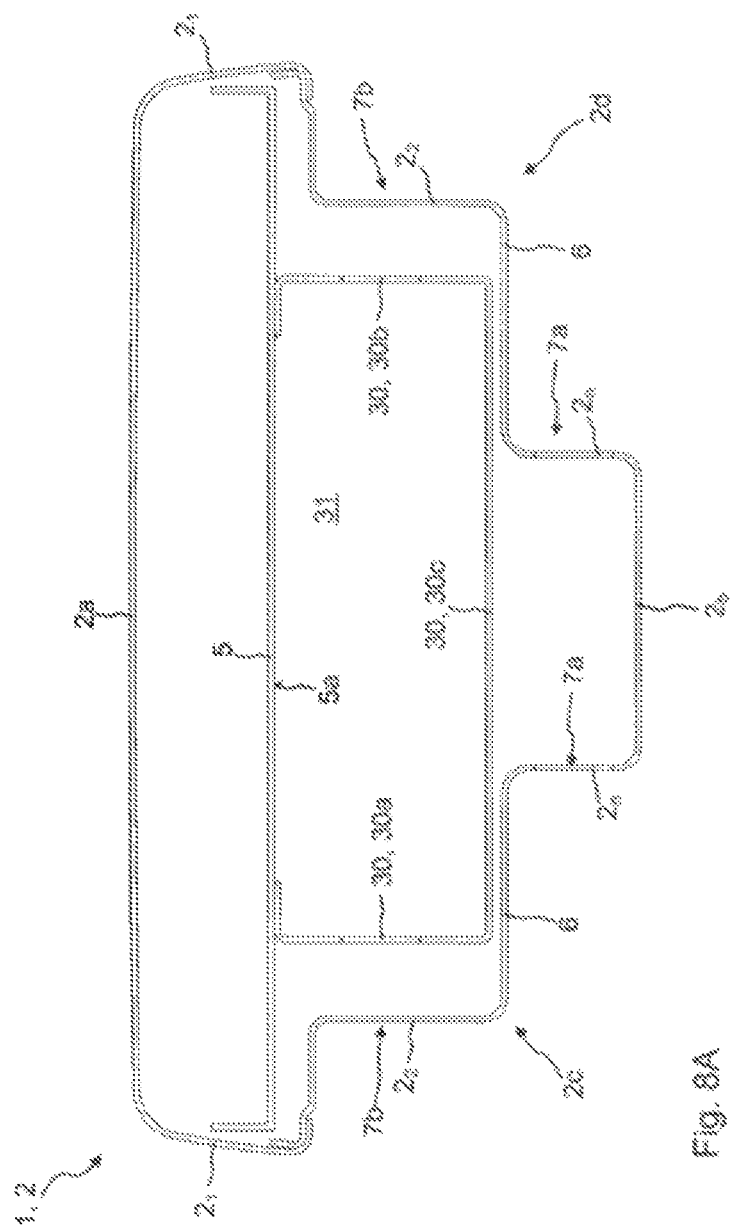

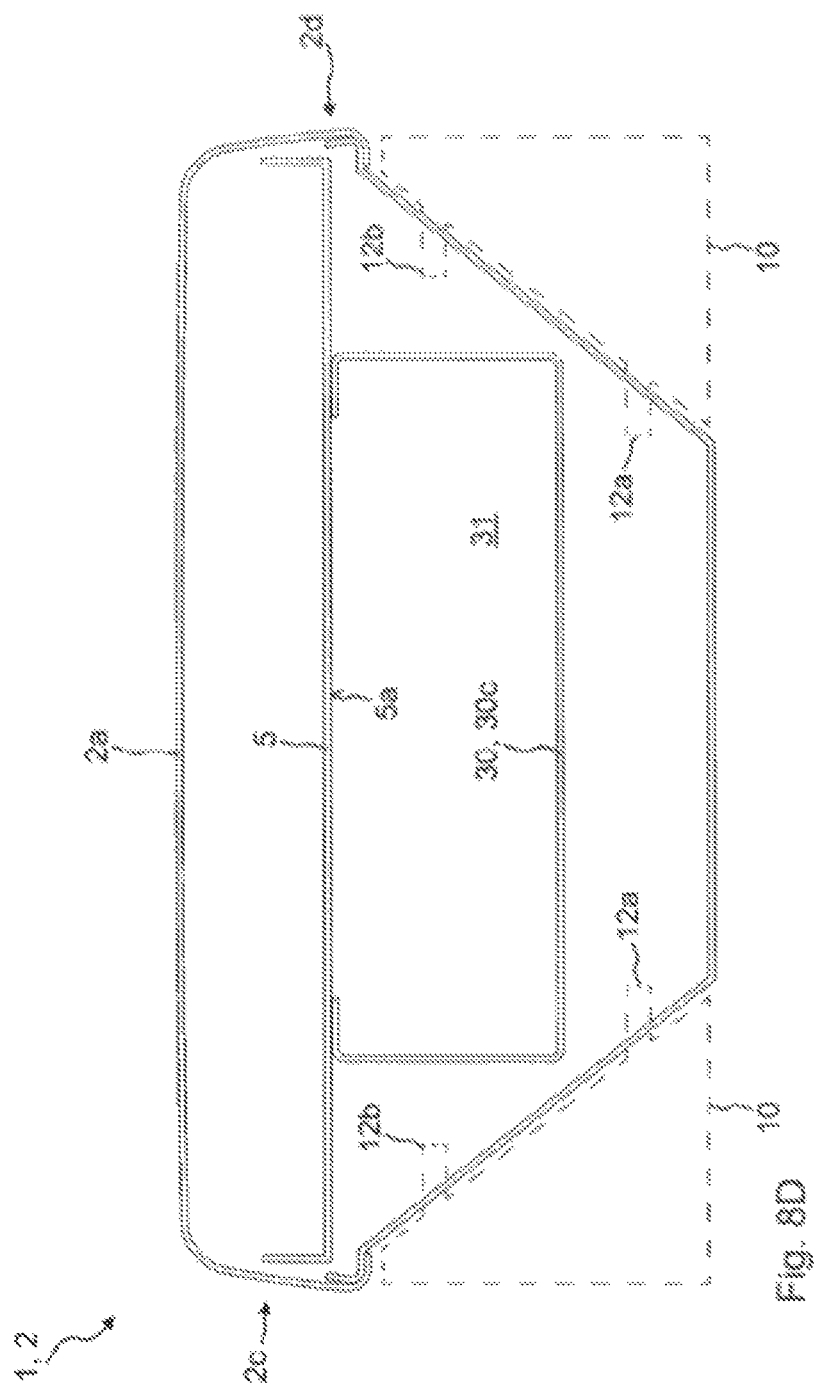

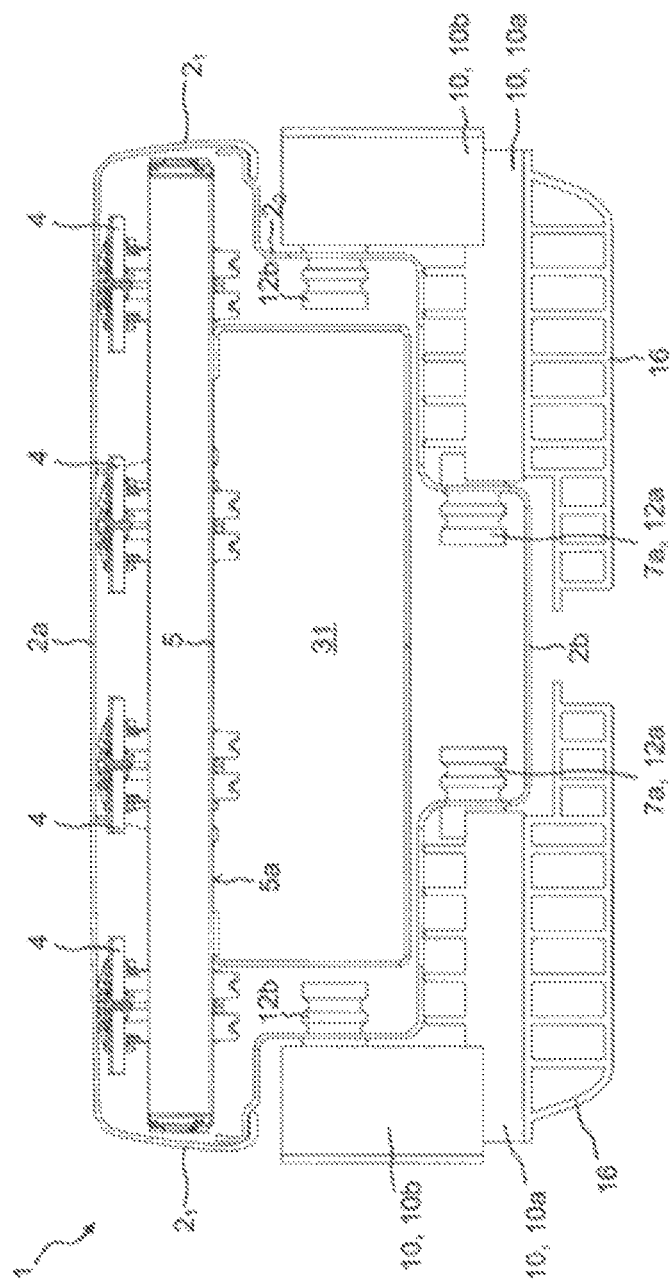

MOBILE COMMUNICATIONS ANTENNA FOR MOUNTING ON A MAST OR WALL-LIKE SUPPORT WITH AT LEAST TWO INTERCHANGEABLE AMPLIFIER MODULES

This application is the U.S. national phase of International Application No. PCT/EP2017/067030 filed Jul. 6, 2017 which designated the U.S. and claims priority to DE 10 2016 112 701.9 filed Jul. 11, 2016, the entire contents of each of which are hereby incorporated by reference.

The invention relates to a (semi-) active mobile communications antenna for a mast-like or wall-like support with interchangeable amplifier modules.

An active mobile communications antenna consists of an antenna and one or more remote radio heads (RRH), which may be mounted on the antenna (semi-active antenna) or integrated into or fixedly connected to the antenna (active antenna). Remote radio head refers to the outdoor, all-weather mounting of the power supply, the sending and receiving assembly (transceiver), the power amplifier and the duplex filter on the antenna mast. The communication with a base station is usually obtained via a digital interface, such as a fibre optic connection. The mobile communications antenna, which in combination with the remote radio heads may also be referred to as a (semi-) active antenna, comprises a plurality of radiating elements or radiating element pairs that are provided with or supplied by a radio unit (amplifier unit). In mobile communications antennas, the low efficiency of the amplifiers and the very complex signal processing process in the digital part cause considerable power losses. The achievable efficiency in such mobile antennas is about 20% to 30%. This means that 70%-80% of the supplied electrical power must be preferably removed as heat. This causes a high cooling requirements in use, which increases the weight and the cost. To make matters worse, the ambient temperatures at which the mobile communications antennas are used may range from −40° C. to +55° C. Accordingly, components (such as FPGAs) for digital signal processing and the power amplifiers (chips) have to be configured for these temperature ranges. Nowadays, active mobile communications antennas are of very compact build and all functional units, such as power amplifiers (PA), processor units (TRX boards), filters, A/D or D/A converters, are therefore arranged within a confined space.

If one of these components fails, all functional units or the entire mobile communications antenna must be replaced. Such a replacement requires that the mobile communications antenna must be completely switched off. Frequently, further operation is not possible with the still functioning functional units.

The functional units are also arranged on or in the mobile communications antenna such that they have to be taken down altogether and the functional units are preferably replaced on the ground. Following this, the mobile communications antenna is hung up again. Since the mobile communications antennas have a high weight, this often requires appropriate crane facilities that may be difficult to deploy, especially in inaccessible areas.

From DE 10 2012 011 092 A1 a mounting system for a mobile communications antenna is known, which allows a mobile component, which is spaced from the mobile antenna, to be replaced in the distance space between the mobile antenna and the mast, without requiring the mobile communications antenna to be taken down.

A disadvantage of the DE 10 2012 011 892 A1 is the complex structure and the increased cabling complexity, as well as the fact that in case of a defect of a single functional unit the active components of a whole mobile communications antenna must still be replaced.

It is therefore an object of the present invention to provide a mobile communications antenna which is compact, has very good electrical properties, in particular very high reliability, and whose functional units may easily be replaced in the event of a fault.

The object is achieved by the mobile communications antenna according to the invention with interchangeable amplifier modules according to independent claim 1. In the dependent claims advantageous developments of the mobile antenna according to the invention are provided.

The mobile communications antenna according to the invention with interchangeable amplifier modules is configured for mounting on a mast-like or wall-like support. It comprises at least one antenna housing with a housing front side, which is permeable to electromagnetic radiation, a housing rear side and a first lateral housing side and a second lateral housing side opposite thereto, which together form an enveloping housing wall. The antenna housing extends along a longitudinal axis. In the antenna housing, a plurality of radiating elements or radiating element pairs are arranged spaced apart in front of at least one reflector. The mobile communications antenna also comprises at least one signal processing and/control unit. It also comprises at least two amplifier modules with a first connection port and a second connection port. The amplifier modules are fastened or mounted on the housing rear side and/or on the first or second lateral side of the housing outside the antenna housing. The at least one signal processing and/or control unit is housed in a housing separate from the amplifier modules in or on the antenna housing of the mobile communications antenna. The at least one signal processing and/or control unit comprises at least one digital interface to a base band unit or to the mobile communications network and interfaces to the separate amplifier modules. The first connection port and the second connection port of the two amplifier modules are connected, via associated connection openings in the antenna housing, to the respective first and second connection contact device by a threaded and/or screw-connection-free plug-in connection.

It is particularly advantageous in the mobile communications antenna according to the invention that the (transmission) amplifiers are located in separate and interchangeable amplifier modules which are remote from the signal processing and/or control unit and are arranged behind the antenna or laterally next to the antenna. The amplifier modules in this embodiment preferably comprise the transmission amplifiers, the amplifier pre-stages, and a feedback of a signal path from the amplifier output for linearization thereof, as well as the transmitting output filters. In this embodiment, separate radiating elements are used for the transmission function and receiving function. The receiving amplifiers and the signal board for linearization are preferably arranged directly in the antenna housing. Another advantage is that by using a plug-in connection the use of a thread and possibly corresponding cap nuts may be omitted. A plug-in connection is considered in particular to be thread-free. As a result, the amplifier modules may be replaced at considerable heights without tools by a technician in a safe manner and only by pulling out and inserting actions. Furthermore, it is particularly advantageous that the amplifier modules are arranged outside the antenna housing of the mobile communications antenna. As a result, they may be cooled more efficiently because the antenna housing is preferably completely closed and sealed against further environmental influences. Another advantage is that the at least one signal processing and/or control unit and the amplifier modules are housed in separate housings. If one amplifier module fails, it is not necessary to replace the further functional units which are integrated in the at least one signal processing and/or control unit. It is also not necessary to replace the other amplifier modules, because preferably also each amplifier module is also housed in a separate housing which is spatially separated from the other housings.

In a development according to the invention, in a plan view of a cross section through the antenna housing, the first and/or the second lateral housing side extend in at least one portion from the housing front side to the housing rear side with a component (direction vector) in the direction of the opposite lateral housing side, as a result of which the housing rear side has a smaller width than the housing front side. The amplifier modules are fastened and/or mounted on the first lateral housing side and/or on the second lateral housing side outside the antenna housing. In this case, each amplifier module is arranged or mounted either on the first lateral housing side and optionally on the housing rear side or on the second lateral housing side and optionally on the housing rear side. For this purpose, the first and/or second lateral housing side has at least two connection openings on two different side wall portions, to each of which first and second connection contact devices are associated.

It is particularly advantageous in this case that the antenna housing tapers in cross-section from the front side of the housing to the housing rear side and that at least one of the (or all) amplifier modules is connected and fastened in different side wall portions by its two connection ports via two connection openings. As a result, a very compact mobile communications antenna may be created. As a result of the fact that the two connection ports engage on different side wall portions which are offset from one another, improved decoupling of the respective signals takes place, which leads to the suppression of oscillations of the amplifier module, which is necessary with high amplification.

In a further development according to the invention, in a plan view of a cross section through the antenna housing, the first and the second lateral housing sides are designed in step-like or zigzag shape and each comprise n side segments with n≥2 or n≥3 or n≥4. The side segments may also be referred to as sidewall portions. The first side segment of the first and second lateral side of the housing adjoins the front side of the housing, and the nth side segment, i.e. the last side segment of the first and the second lateral side of the housing, adjoins the housing rear side. A distance between the respective side segments of the first and second lateral housing sides preferably decreases gradually from the first side segment to the nth side segment. The first and/or second lateral housing side has, on two different side segments, for the at least one amplifier module, the at least two connection openings having the associated first and second connection contact devices. The stepped construction of the antenna housing further facilitates the mounting of the amplifier modules.

In a development according to the invention, the first connection port and the second connection port of at least one amplifier element extend through the connection openings, which are formed in different side segments of the first or second lateral housing side, into the antenna housing and are connected by the plug-in connection within the antenna housing to the corresponding first and second connection contact devices. In this case, the first port and the second port could also have a sealing device to ensure that environmental influences such as rain or snow have no effect on the interior of the antenna housing. Alternatively, it would also be possible for the first and second connection contact devices to extend through the connection openings in the different side segments of the first or second lateral housing side from within the antenna housing to the outside of the antenna housing. The connection to the respective connection ports would then take place outside the antenna housing. In this case, the connection contact devices would preferably include the sealing device. At least one of the amplifier modules would be connected via a first connection port directly or indirectly via the first connection contact device to the at least one signal processing and/or control unit for signal transmission. Via the second connection port, it would be directly or indirectly connected, via the second connection contact device, to a radiating element or pair of radiating elements for signal transmission. Preferably, an indirect connection to the radiating elements or pair of radiating elements is used, because more devices, such as phase shifters, are interposed therebetween.

In this context, the mobile communications antenna preferably comprises a plurality of phase shifters, by means of which the amplifier module is indirectly connected to the radiating elements or pair of radiating elements for signal transmission. In order to arrange or mount the phase shifters securely within the antenna housing, in another embodiment the mobile communications antenna comprises an inner housing device which is disposed within the antenna housing. The inner housing device is arranged on a rear side of the at least one reflector and forms a receiving space, together with its two opposite side surfaces, its rear wall and the rear side of the reflector. In this receiving space, the phase shifters may be arranged. These would then preferably be fastened to corresponding holding and/or supporting elements, which in turn are preferably fastened to the inner housing device.

For mounting of the connection contact devices, fastening openings, which are preferably also opposite each other, are made in the side walls of the inner housing device, wherein in these fastening openings, the second connection contact devices are arranged or fastened.

In order to fasten the first connection contact devices, fastening lugs are formed on the rear wall of the inner housing device, which extend in the direction of the housing rear side of the antenna housing. A distance between two approximately opposite fastening lugs is smaller than a distance between the two side walls of the inner housing devices, because the fastening lugs are closer to the housing rear side than the side walls of the inner housing device and the antenna housing tapers in the direction of the housing rear side. These fastening lugs, which are preferably punched out of the rear wall of the inner housing device, are preferably further connected at one end to the rear wall (which forms a bending edge) and are bent by a bending process towards the rear side of the antenna housing. These fastening lugs comprise further fastening openings in which the at least first connection contact devices are arranged or fastened.

In another embodiment of the invention, at least one of the amplifier modules forms, in particular, the transmission amplifier, which amplifies mobile communication signals which are to be emitted via the radiating elements or radiating element pairs. This transmission amplifier must be designed to be more powerful than any receiving amplifier, resulting in more heat, which must be dissipated. In principle, however, it would also be possible for at least one amplifier module to include a receiver amplifier, which amplifies mobile communication signals received via the radiating elements or radiating element pairs. However, this at least one receiving amplifier is preferably integrated in the signal processing and/or control unit for amplifying the mobile communication signals received via the radiating element or pair of radiating elements. This at least one receiving amplifier is preferably a low noise amplifier (LNA). Of course, it is also possible to use a plurality of amplifier modules which either contain exclusively transmission amplifiers. It is also possible to use mixed combinations, that is to say a first amplifier module comprises a transmission amplifier, whereas another or further amplifier module includes a receiving amplifier.

In order to ensure easy interchangeability, without the mast or the wall-like support interfering with the replacement procedure, at least one, preferably several or all amplifier modules may be plugged onto the antenna housing when viewed towards the first and/or second lateral side of the housing. In this context, the first or the second connection port of the amplifier module is arranged in the insertion direction continuously relative to the second or first connection port. This means that in the insertion direction, a connection port protrudes with respect to the other connection port, wherein the word "protrude" is to be understood as being based on the direction of movement for inserting or removing.

In order to achieve improved decoupling of the individual connection ports of at least one amplifier module, they may be arranged at different distances from the front side of the housing, for example. Preferably, however, they are arranged offset from one another, in particular in the direction of the longitudinal axis.

In a further embodiment of the invention, at least one amplifier module preferably comprises a filter housing in addition to an amplifier housing. In the amplifier housing, a power amplifier is arranged, and in the filter housing a high-frequency filter, in particular one in a cavity design, is arranged. Via a signal line, the filter housing and the amplifier housing are connected to each other for signal transmission. The high-frequency filter comprises several resonator chambers, which have a resonator inner conductor. The resonator inner conductors are galvanically connected to the resonator bottom and extend in the direction of the housing cover. However, they end at a distance from the housing cover or they are galvanically separated from it. A capacitive or inductive or even galvanic coupling to a resonator inner conductor of a first resonator in the high-frequency filter may be produced via the signal line.

The amplifier housing and the filter housing of at least one amplifier module are made of or comprise metal or a metal alloy such as aluminium. The amplifier housing and the filter housing may consist of a common milled and/or cast part. In this case, they would be made in one piece. Preferably, however, the amplifier housing and the filter housing are made of separately formed milled and/or cast parts, which are firmly connected to each other via a mechanical connection, such as a screw connection. In this case, the first connection port is preferably arranged on the amplifier housing and the second connection port is preferably arranged on the filter housing. The second connection port is coupled to a resonator chamber or a resonator inner conductor of the filter housing capacitively or inductively or galvanically. It is particularly advantageous that the amplifier housing and the filter housing are firmly connected to each other, or are made in one piece. As a result, the filter housing also serves as a heat sink for the heat generated in the amplifier housing. This increases the surface available for cooling the amplifier housing.

The amplifier module is preferably constructed in such a way that it matches, with its housing shape, the stepped profile of the first or second lateral housing side of the antenna housing. The amplifier housing is aligned with its longer side perpendicular to, or with a component predominantly perpendicular to, the longitudinal axis, whereas the filter housing is aligned with its longer side parallel to, or with a component predominantly parallel to the longitudinal axis. This means that the amplifier modules are provided with an L-shaped structure in a side view, that is, for example, when viewed towards the housing rear side of the antenna housing. At least one of the amplifier modules may thereby be plugged onto the antenna housing or removed therefrom with a motion vector which extends exclusively perpendicularly to, or has a component predominantly perpendicular to, the first or second lateral housing side and/or extends in parallel with, or has a component predominantly parallel to the reflector plane. This means that the amplifier module may be plugged laterally onto the antenna housing or removed therefrom. The antenna housing may therefore be arranged very close to the mast or wall-like support.

In plan view of the front side of the antenna housing at least one amplifier module in the mounted state is predominantly or preferably completely covered by the housing front side. As a result, the aesthetic overall impression of the mobile communications antenna is not impaired.

In order to ensure that the amplifier module is or remains permanently connected to the antenna housing, in a further embodiment according to the invention, the amplifier module preferably also comprises a locking device which is fastened to the amplifier module. In the mounted state of the amplifier module, the locking device engages in a locking opening, which is located in the first or second lateral housing side and prevents, by this engagement, the at least one amplifier module from being removed without actuation of the locking device.

In order to improve cooling, at least one amplifier module comprises cooling ribs, which are preferably fastened to those housing surfaces of the amplifier module which are parallel to the housing front side or the rear side of the antenna housing. The cooling ribs extend in parallel with, or with a component predominantly parallel to the longitudinal axis, which in turn means that air gaps are formed between the cooling ribs, which also extend in parallel with, or with a component predominantly parallel to the longitudinal axis. This ensures that, in the mounted state of the mobile communications antenna, an air flow may form along the cooling ribs and flows from the bottom of the mobile communications antenna, that is to say an underside (ground-level or lower end side) of the mobile communications antenna in the direction of an upper side (upper end side) of the mobile communications antenna. In the case that several amplifier modules are fastened to the mobile communications antenna, these are preferably spaced apart from one another along the longitudinal axis of the first lateral housing side and/or mounted on the second lateral housing side. An airflow then travels along all the cooling ribs of all the amplifier modules on the first and/or all amplifier modules on the second lateral side of the housing. In this case, the amplifier modules would be arranged in two rows along the longitudinal axis. The cooling may be improved by the use of active cooling components, such as fans, which can be controlled in a temperature-dependent manner.

In another embodiment according to the invention, at least one amplifier module preferably also comprises a display element, in particular in the form of an LED. The display element is visible from outside the antenna housing. The amplifier module or the at least one signal processing and/or control unit is adapted to control the display element such that it visually signals a defect of the at least one amplifier module. The control may be carried out in such a way that in the event that the at least one amplifier module is defective, the LED is switched on or off or, when using multiple LEDs, an LED with a different colour is activated. This makes it easy for the technician on the mast to determine which amplifier module has to be replaced. After replacing the amplifier module, during which the mobile communications antenna preferably does not have to be switched off, the technician may immediately check, on the basis of the LED status display on the newly inserted amplifier module, whether the replacement was effective or not.

The mobile communications antenna preferably also comprises at least one power supply device, wherein the at least one power supply device is fastened to one or more side segments of the first or second lateral housing side. The at least one power supply device can preferably also be mounted on or removed from the antenna housing with a motion vector which is exclusively perpendicular to, or has a component predominantly perpendicular to, the first or second lateral housing side. The power supply device also has corresponding connections, which may be connected to the corresponding terminals within the antenna housing via a plug-in connection, in particular without tools. Preferably, a plurality of power supply devices are used, wherein the mobile communications antenna may continue to operate without loss of function or with only minor losses of transmission power even in case of failure of a power supply device. The power supply device may also be comprise, like the amplifier modules, a locking device. It may also include a display element.

The signal processing and/or control unit is applied to one or more side segments of the first and/or second lateral housing side and/or on the housing rear side of the antenna housing. Preferably, the at least one signal processing and/or control unit, in a plan view of the housing rear side, rests on the at least one power supply device or completely or partially overlaps the same in plan view. Preferably, in the mounted state of the mobile communications antenna, the at least one power supply device and the signal processing and/or control unit are arranged at the bottom end of the mobile communications antenna, because in this position the temperatures are lower than at the opposite end (no hot air rising through the amplifier modules). The at least one signal processing and/or control unit can preferably also be connected to the corresponding counterparts within the antenna housing via a plug-in connection. This means that, in a tool-free manner, a technician may separate the signal processing and/or control unit, as well as the power supply device, from the antenna housing and connect them thereto.

Various exemplary embodiments of the invention will now be described by way of example with reference to the drawings. Same objects have the same reference numerals. In the corresponding figures of the drawings:

FIG. 7 shows a simplified spatial representation of the opened mobile communications antenna according to the invention;

FIG. 8A, 8B, 8C, 8D show simplified representations of a cross section through the mobile communications antenna according to the invention; and FIG. 9 shows an illustration of a cross section of the mobile communications antenna according to the invention.

Figure 1A:
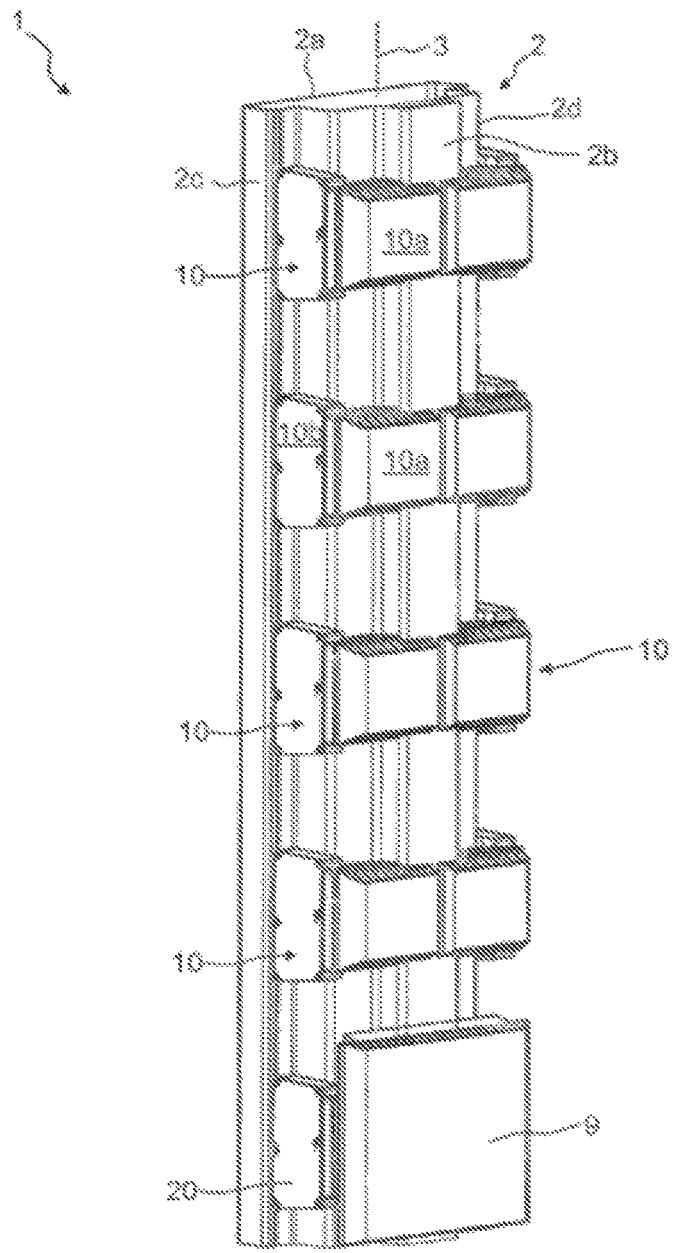
FIG. 1A, 1B show a spatial representation of various embodiments of the mobile communications antenna according to the invention.
Figure 1B:
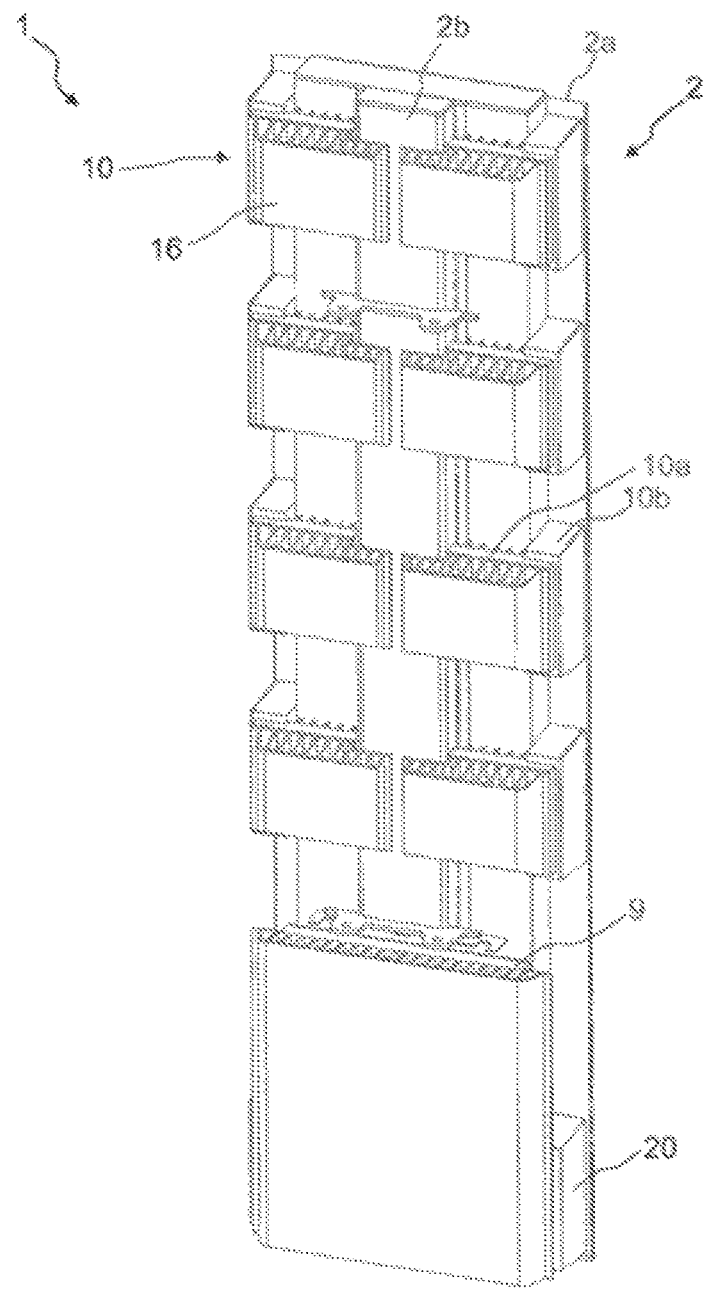

FIGS. 1A and 1B show a spatial representation of the mobile communications antenna 1 according to the invention. The mobile communications antenna 1 according to the invention may be mounted on a mast-like or wall-like support. Its task is to provide different communication standards for mobile terminals. The mobile communications antenna 1 comprises at least one antenna housing 2 which has a housing front side $2a$, a housing rear side $2b$ and a first lateral housing side $2c$ and a second lateral housing side $2d$ opposite thereto, which together form an enveloping housing wall. The antenna housing 2 extends along a longitudinal axis 3, as shown for example in FIG. 7.

In the antenna housing 2, a plurality of radiating elements or radiating element pairs 4 (see FIG. 7) are arranged spaced apart in front of at least one reflector 5. These radiating elements or radiating element pairs belong to a preferably dipole-shaped radiating element arrangement. The dipole-shaped radiating element arrangement in this case comprises two pairs of radiating element halves, which are arranged rotated by 90° relative to one another so that the dipole radiating element arrangement transmits and/or receives in two mutually perpendicular polarization planes. The radiating element halves, that is to say the two radiating element pairs, are aligned in a radiating element plane, which preferably extends in parallel with the reflector 5. The radiating elements or radiating element pairs 4 also include a symmetry and/or support assembly having a first end and a second end, the second end being opposite the first end. The radiating elements or radiating element pairs 4 are arranged at the first end of the symmetry and/or support assembly. The second end of the symmetry and/or support assembly is fastened to the reflector 5. The dipole radiating element arrangement is preferably in the form of a vector dipole, a crossed dipole or a dipole square.

The radiating elements or radiating element pairs 4 are arranged within the antenna housing 2 in such a way that they radiate their mobile communication signals through the housing front side $2a$ and, optionally, at least partially through the first or second lateral housing side $2c$, $2d$.

Figure 8B:
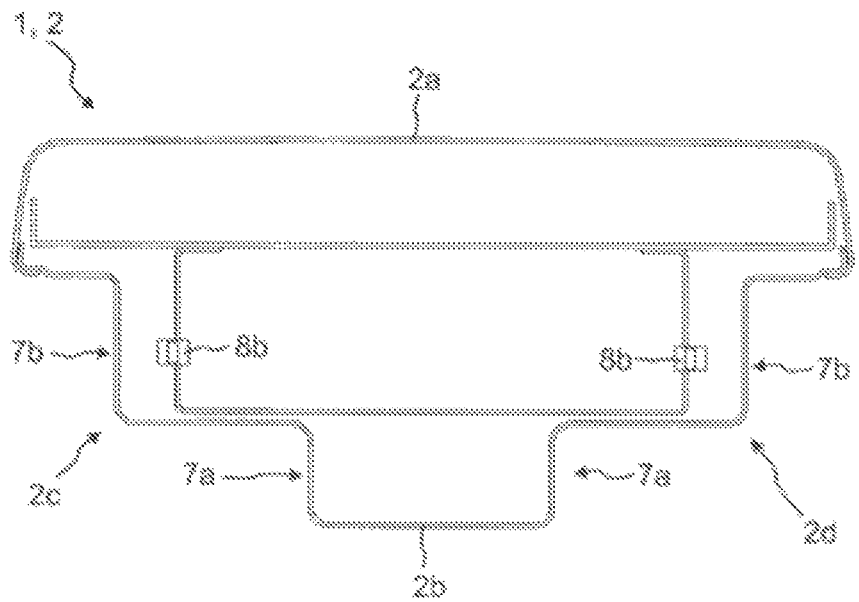
Figure 8C:
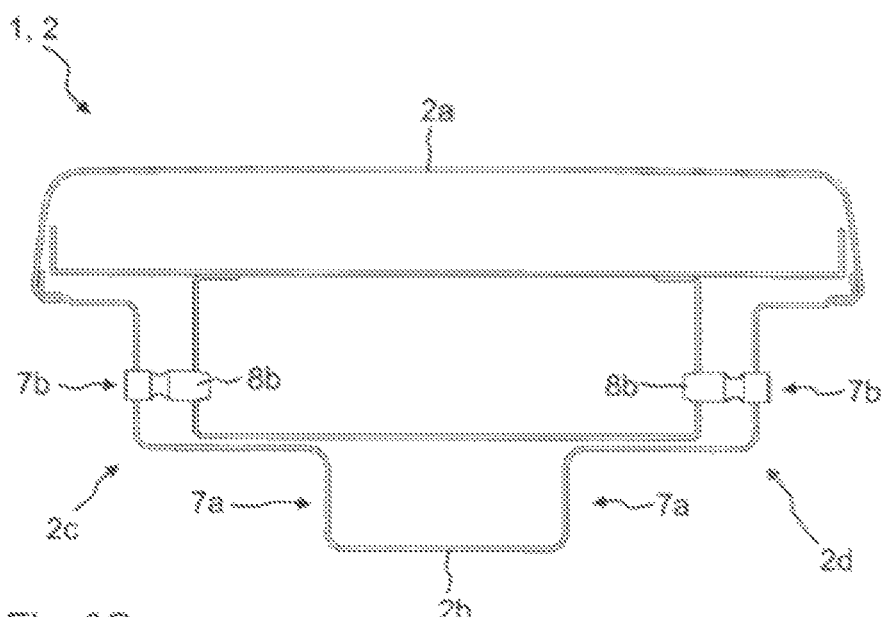

With regard to the shape of the antenna housing 2, reference is made to FIG. 8A to 8C. These show a plan view of a cross section through the antenna housing 2. The first and second lateral housing sides $2c$, $2d$ have a stepped design and each comprise n side segments $2_1$, $2_2$, $2_n$ with $n \geq 2$ or $n \geq 3$. The first side segment $3_1$ of the first and second lateral housing sides $2c$, $2d$ adjoins the housing front side $2a$. In contrast, the n-th side segment $2_n$ of the first and second lateral housing sides $2c$, $2d$ adjoins the housing rear side $2b$. "Adjoin" should be understood as a one-part or multi-part connection, for example involving a mechanical frictional connection, such as a screw connection.

A distance between the respective side segments $2_1$, $2_2$, $2_n$ of the first and second lateral housing sides $2c$, $20$ preferably decreases gradually from the first side segment $2_1$ to the nth side segment $2_n$. The individual side segments $2_1$, $2_2$, $2_n$ are interconnected via connecting segments 6. These connecting segments 6 preferably run in parallel with the reflector 5, or preferably in parallel with, or with a component predominantly parallel to, the housing front side $2a$ or housing rear side $2b$ of the antenna housing 2. In principle, these connecting segments 6 could also be arranged obliquely, i.e. at an angle of for example 45° to the reflector 5.

Due to the fact that the antenna housing 2 is provided, in a plan view of its cross-section, with step-like or zigzag lateral housing sides $2c$, $2d$, receiving spaces for further modules are created. These further modules or functional units may be connected to components within the antenna housing 2 via corresponding connection openings $7a$, $7b$ and fastened to the antenna housing 2. For this purpose, the first and/or second lateral housing side $2c$, $2d$ comprise, on two different side segments $2_1$, $2_2$, $2_n$, at least two connection openings $7a$, $7b$, with which a first and a second connection contact device $8a$, $8b$ are associated. The at least one first and the at least one second connection contact device $8a$, $8b$ are preferably arranged with a constant length and immovably fastened in the region of the connection openings $7b$, $7b$.

In contrast, FIG. 8D shows a further exemplary embodiment of the mobile communications antenna 1. In this embodiment, the antenna housing 2 tapers generally from the housing front side $2a$ towards the housing rear side $2b$. In a plan view of a cross section through the antenna housing 2, the first and/or the second lateral housing side $2c$, $2d$ extend, in at least one portion, from the housing front side $2a$ to the housing rear side $2b$ with a component in the direction of the opposite lateral housing side $2c$, $2d$. As a result, the housing rear side $2b$ has a smaller width than the housing front side $2a$. Two amplifier modules 10 are shown by dashed lines, and their housing contour is adapted to the contour of the first or second lateral housing side $2c$, $2d$. Furthermore, the respective connection ports $12a$, $12b$ of the amplifier modules 10 are shown. These engage on different side wall portions of the first or second lateral housing side $2c$, $2d$. The profile of the first or second lateral housing side $2c$, $2d$ may be straight or arcuate or partially circular in plan view of the cross section through the antenna housing 2 or may be divided into side wall portions aligned at an angle to one another.

The oblique or step-shaped contour of the first or second lateral housing side $2c$, $2d$ may extend over the entire length of the antenna housing 2 or over a smaller partial length. In this case, this contour is preferably provided in the middle region of the antenna housing 2.

The connection contact devices $8a$, $8b$ are shown in FIGS. 8B and 8C. As shown in FIG. 8C, they may also protrude from the respective connection opening $7a$, $7b$ and extend to the outside of the antenna housing 2. In FIG. 8B, the connection contact devices $8a$, $8b$ are arranged exclusively within the antenna housing 2.

These connection contact devices $8a$, $8b$ serve to connect the radiating element or pair of radiating elements 4, via an amplifier, to the at least one signal processing and/or control unit 9, which is also part of the mobile communications antenna 1. Such an amplifier connected between the radiating element or radiating element pairs 4 and the signal processing and/or control unit 9 is arranged or integrated in particular in at least one amplifier module 10. Preferably, at least two amplifier modules 10 are used. Further preferably, at least two amplifier modules 10 are used per band, wherein the signal transmission on a band should still be guaranteed even if one amplifier module 10 fails. The at least one amplifier module 10 can be or is fastened to the outside of the antenna housing 2. The at least one amplifier module 10 preferably forms a transmission amplifier which amplifies mobile communication signals which are transmitted via the radiating elements or radiating element pairs 4.

When using a plurality of amplifier modules 10, it is also possible that the at least one amplifier module 10 forms a receiving amplifier that amplifies mobile communication signals that are received via the radiating element or radiating element pairs 4. However, the at least one receiving amplifier is preferably integrated in the signal processing and/or control unit 9.

The at least one amplifier module 10 or the amplifier modules 10 may be plugged into the antenna housing 2 when viewed towards the first and/or the second lateral housing side $2c$, $2d$. In this case, the at least one amplifier module 10 is pluggable or removable without tools. This means that no screw connections may need to be loosened using tools. The tool-free plugging or removing of the at least one amplifier module 10 from the antenna housing 2 in particular is of inestimable benefit for a technician working at considerable heights.

In this case, the at least one amplifier module 10 may be plugged into or removed from the antenna housing 2 with a motion vector which is exclusively perpendicular to, or has a component predominantly perpendicular to, the first or second lateral housing side $2c$, $2d$ and/or which is parallel to, or has a component predominantly parallel to, the reflector plane of the reflector 5. In plan view of the housing front side $2a$ of the antenna housing 2, the at least one amplifier module 10 in the mounted state is preferably completely covered by the housing front side $2a$.

FIGS. 1A and 1B show that the mobile communications antenna 1 comprises a plurality of amplifier modules 10. The amplifier modules 10 are mounted on the first lateral housing side $2c$ and the second lateral housing side $2d$ so as to be spaced apart along the longitudinal axis 3. The amplifier modules 10 mounted on the first lateral side of housing $2c$ are preferably not in mechanical contact (i.e. are contact-free) with the amplifier modules 10 mounted on the second lateral housing side $2d$.

With reference to FIGS. 3, 4, 5 and 6, the structure and operation of the amplifier modules 10 will be explained in more detail.

The amplifier module 10 comprises the actual amplifier (in particular a transmission amplifier but also alternatively a receiving amplifier) with an output stage and a driver stage. Optionally, a circulator may be provided for decoupling. These components are housed in an amplifier housing $10a$. In addition to this, the at least one amplifier module 10 preferably still has a filter housing $10b$. In the filter housing $10b$, a high-frequency filter, in particular a high-frequency filter in a cavity design, is arranged. Both the filter housing $10b$ and the amplifier housing $10a$ include a housing body formed of side elements and a bottom element. This housing body is closed by corresponding housing covers $11a$, $11b$. A first housing cover $11a$ is used to terminate the amplifier housing $10a$, whereas a second housing cover $11b$ is used to terminate the filter housing $10b$.

The filter housing $10b$ and the amplifier housing $10a$ are connected or coupled to one another for signal transmission via a signal line (not shown). In particular, the output of the power amplifier in the amplifier housing $10a$ may be coupled via the signal line to a first resonator, and within this in particular to a first resonator inner conductor within the filter housing 10b. Such a coupling is preferably capacitive. However, it could also be done inductively or galvanically. In the filter housing 10b further resonators are formed, which are more or less strongly coupled to each other, whereby the desired filter curve is established.

The amplifier housing 10a and the filter housing 10b of the at least one amplifier module 10 consist of and comprise metal or a metal alloy. The amplifier housing 10a and the filter housing 10b may be made of a common milled and/or cast part, so that they cannot be separated from one another in a non-destructive manner. Preferably, the amplifier housing 10a and the filter housing 10b are formed from separately formed milled and/or cast parts, which are fixedly connected to each other via a mechanical connection, in particular a screw connection.

The at least one amplifier module 10 is preferably L-shaped and matches with its housing shape the shape of the stepped first or second lateral housing side 2c, 2d of the antenna housing 2. This shape is produced in particular in that the amplifier housing 10a is preferably aligned with its longer side perpendicular to, or with a component predominantly perpendicular to, the longitudinal axis 3, whereas the filter housing 10b is aligned, preferably with its longer side, in parallel with, or with a component predominantly parallel to the longitudinal axis 3. The filter housing 10b and the amplifier housing 10a are preferably perpendicular to each other. In this state, the amplifier housing 10a and the filter housing 10b are screwed together and inserted into the antenna housing 2.

For contacting, the amplifier module 10 comprises a first connection port 12a and a second connection port 12b. The first connection port 12a and the second connection port 12b of the at least one amplifier module 10 are connected, via the two connection openings 7a, 7b of the first or second housing side 2c, 2d, to the first and the second connection contact device 8a, 8b by a plug-in connection.

In the event that the amplifier module 10 does not include a filter housing 10b, both connection ports 12a, 12b are formed on the amplifier housing 10a. By contrast, the exemplary embodiments of FIGS. 3 to 6 show a filter housing 10b, and so the first connection port 12a is formed on the amplifier housing 10a and the second connection port 12b is formed on the filter housing 10b. Signals to be amplified are transmitted via the first connection port 12a from the signal processing and/or control unit 9 to the amplifier housing 10a and the power amplifier located therein. By means of a signal line (not shown), the amplified signals are transmitted from the amplifier housing 10a into the filter housing 10b, where they are output, freed from any harmonics, at the second connection port 12b. The second connection port 12b then leads to any phase shifters and from there directly to the radiating elements or radiating element pairs 4.

FIG. 9 shows a further cross section through the mobile communications antenna 1 according to the invention. In this case, it may be seen that the first connection port 12a and the second connection port 12b of the at least one amplifier module 10 extend into the antenna housing 2 through the connection openings 7a, 7b, which are formed in different side segments $2_1$, $2_2$, $2_n$ of the first or second lateral housing side 2c, 2d. In this antenna housing 2, they are connected to the first and second connection contact devices 8a, 8b by a plug-in connection. These connection contact devices 8a, 8b are not shown in FIG. 9 for the sake of clarity. This connection may be released by simply pulling the amplifier module 10 sideways off the antenna housing 2.

The connection contact devices 8a, 8b may also extend through the connection openings 7a, 7b to the outside of the antenna housing, wherein the plug-in connections between the connection contact devices 8a, 8b and the connection ports 12a, 12b outside the antenna housing 2 are formed. In order to ensure that moisture does not penetrate into the antenna housing 2 through the connection openings 7a, 7b, the first and/or second connection port 12a, 12b of the at least one amplifier module 10 is provided with a sealing device. The same could also apply to the first and/or second contact device 8a, 8b if they extend through the connection openings 7a, 7b to the outside of the antenna housing 2. The contacting of the connection ports 12a, 12b with the connection contact devices 8a, 8b is thread-less and/or screw-less and/or solderless. In this case, the connection ports 12a, 12b or the connection contact devices 8a, 8b are respectively designed as plugs and sockets.

For each amplifier module 10, there are preferably exactly two such connection openings 7a, 7b. These are introduced on the first housing side 2c or on the second housing side 2d.

The connection openings 7a, 7b at which the at least one amplifier module 10 engages or is in contact are arranged on mutually (directly) adjacent side segments $2_1$, $2_2$, 2 of the first or second lateral housing side 2c, 2d. Alternatively, the connection openings 7a, 7b may also be arranged on side segments $2_1$, $2_2$, $2_n$ of the first or second lateral housing side 2c, 2d, which are spaced apart from each other by at least one further side segment $2_1$, $2_2$, $2_n$.

Figure 3:
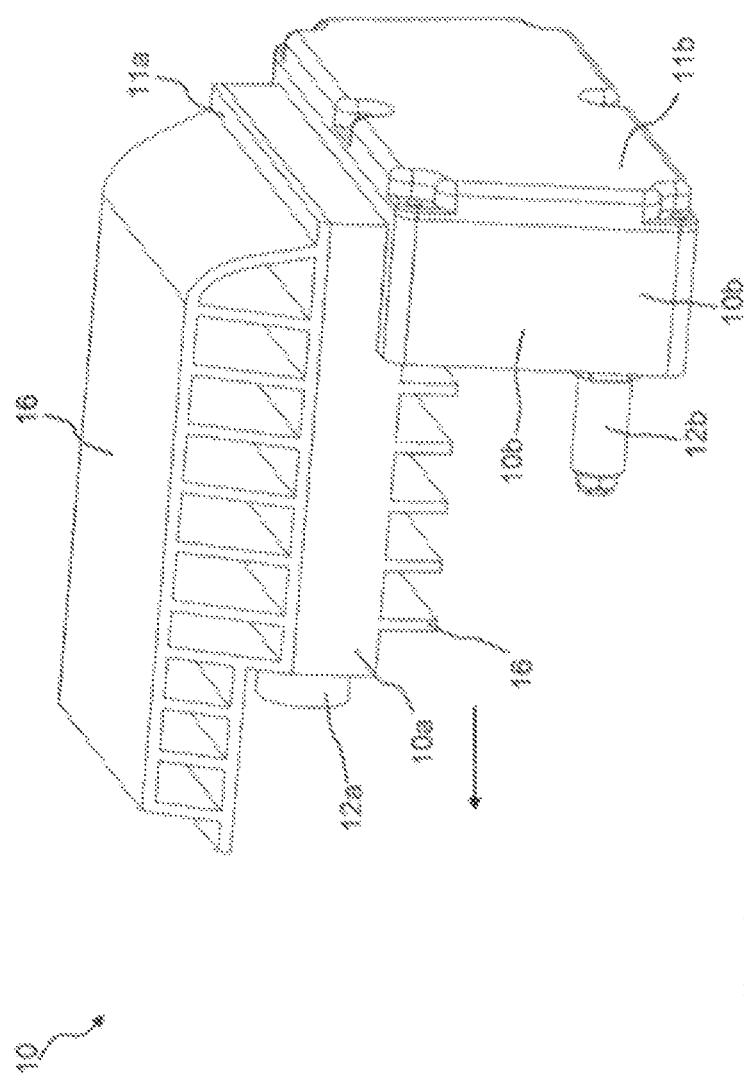
FIG. 3 shows a perspective view of an amplifier module of the mobile communications antenna according to the invention.
Figure 4:
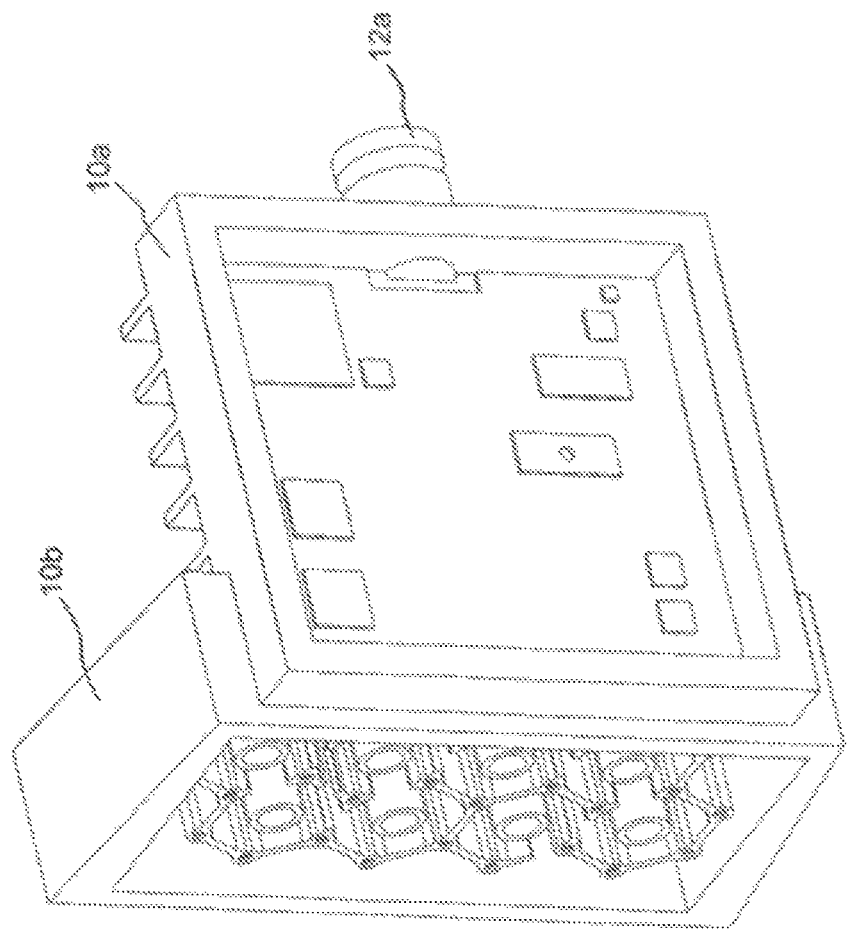
FIG. 4, 5 show spatial representations of the opened amplifier module.
Figure 5:
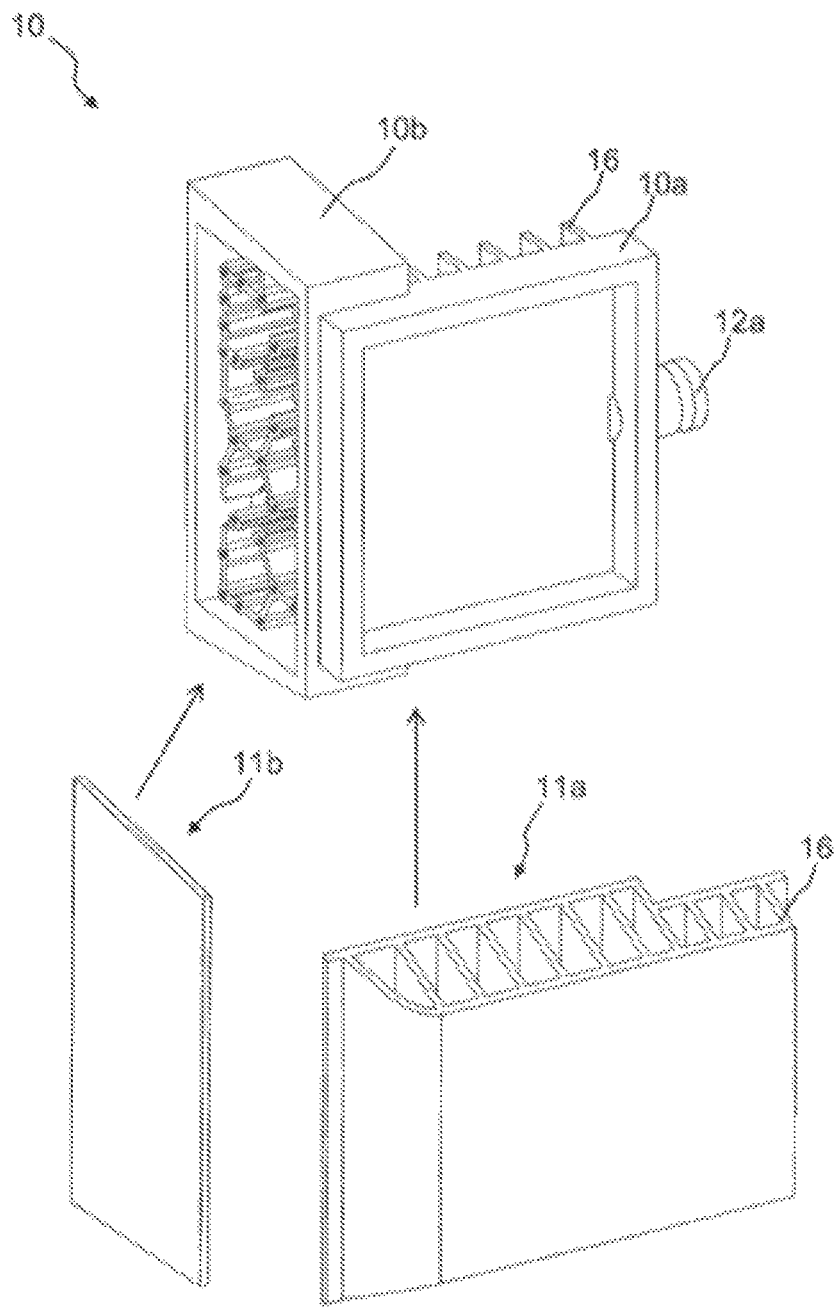

With reference to FIG. 3, it may be seen that the first connection port 12a of the amplifier module 10 is arranged in the insertion direction (indicated by an arrow) continuously relative to the second connection port 12b. This means that the first connection port 12a protrudes beyond the second connection port 12b. The orientation could also be reversed.

In the mounted state, the second connection port 12b of the at least one amplifier module 10 is preferably arranged closer to the housing front side 2a than the first connection port 12a of the at least one amplifier module 10. It would also be possible for the first and the second connection port 12a, 12b of the at least one amplifier module 10 to be offset from one another in the direction of the longitudinal axis 3. Preferably, both connection ports 12a, 12b of an amplifier module extend in a common plane, which in turn is preferably arranged perpendicularly to the reflector plane of the reflector 5.

In the mounted state, the amplifier housing 10a is oriented with its longer side perpendicular to, or with a component predominantly perpendicular to, the longitudinal axis 3, i.e. parallel to, or with a component predominantly parallel to, the reflector plane of the reflector 5. Conversely, the filter housing 10b is aligned with its longer side parallel to, or with a component predominantly parallel to, the longitudinal axis 3, that is perpendicular to, or with a component predominantly perpendicular to, the reflector plane of the reflector 5. This means that the filter housing 10b and the amplifier housing 10a are oriented perpendicularly to, or with a component predominantly perpendicular to, each other. Both housings 10a, 10b are preferably firmly connected to one another via a mechanical frictional connection, in particular a screw connection, so that a low heat transfer resistance value is achieved. This has the advantage that the filter housing 10b may serve as a heat sink for the amplifier housing 10a, as a result of which the effective surface for dissipating the power loss occurring in the amplifier housing 10a increases.

The at least one amplifier module 10 also comprises cooling ribs 16, which are fastened to those housing surfaces of the amplifier module 10a which extend in parallel with the housing front side 2a or housing rear side 2b of the antenna housing 2. The cooling ribs 16 extend in parallel with, or with a component predominantly parallel to, the longitudinal axis 3. Between cooling ribs 16 air gaps are formed, which also preferably extend in parallel with, or with a component predominantly parallel to, the longitudinal axis 3. The at least one amplifier module 10a may also include an active cooling device, such as a fan. The cooling ribs 16 which are arranged closer to the housing front side 2a in the mounted state preferably rest on a connecting segment 6, which connects two side segments $2_1$, $2_2$, $2_n$, or are adjacent thereto. The ends of the cooling ribs which are further away from the housing front side 2a may additionally be provided with a cooling surface which connects the ends (tips) of the cooling ribs 16 together. The cooling surface thus formed then runs in parallel with the housing front side 2a or in parallel with the reflector plane of the reflector 5. It is also possible that the filter housing 10b has cooling ribs.

When viewed towards the first or second lateral housing side 2c, 2d, the cooling ribs 16 of the at least one amplifier module 10 which are arranged on the housing surface of the amplifier module 10 arranged closer to the housing rear side 2b project beyond the rear side 2b. The cooling ribs 16 preferably extend with at least one part over the housing rear side 2b. This means that a part of the cooling ribs 16 rests on the housing rear side 2b or are only spaced therefrom by a gap.

These cooling ribs 16 are preferably formed integrally with the first housing cover 11a, which closes the amplifier housing 10a.

The second housing cover 11b, which closes the filter housing 10b, is preferably a metal sheet, which may also have a sealing device.

As a result of the antenna housing 2 having a step-shaped profile in cross-section with respect to its first and second lateral housing sides 2c, 2d, a connection space is formed, in which the at least one amplifier module 10 is arranged.

Figure 6:
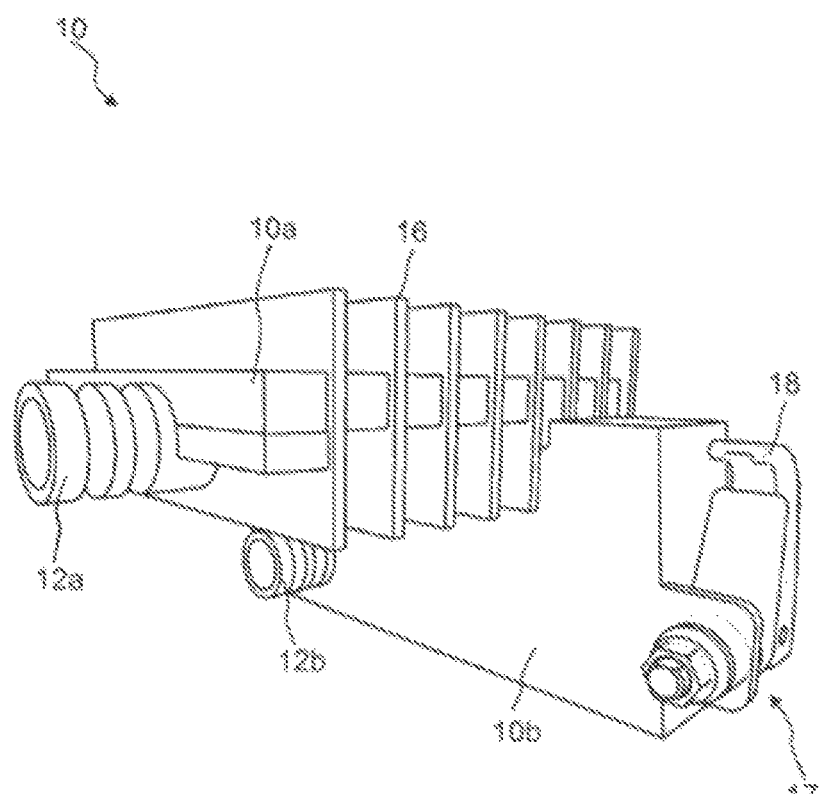
FIG. 6 is a spatial representation of another exemplary embodiment of the amplifier module.

With reference to FIG. 6, it is shown that the at least one amplifier module 10 comprises a locking device 17, which is mechanically fastened to said module. In the mounted state, the locking device 17 engages in a locking opening (not shown) which is formed in the first or second lateral housing side 2c, 2d. This prevents the at least one amplifier module 10 from being removable without actuation of the locking device. The locking device 17 preferably comprises an actuating lever 18. This actuating lever 18 must be folded over in order to remove or extract the amplifier module 10 from the antenna housing 2. Depending on the position of this actuating lever 18, the locking device 17 may be adjusted between a locking position and a release position, wherein only in the release position may the amplifier module 10 be removed. The locking device 17 also preferably transmits the loads. This means that preferably no forces are transmitted via the connection ports 12a, 12b in the mounted state. The weight force acting on the at least one amplifier module is preferably introduced into the antenna housing 2 predominantly or exclusively via the locking device 17. In particular, exactly one locking device 17 with exactly one actuating lever 18 is provided for each amplifier module 10. As a result, a technician may remove the amplifier module 10 and replace it with another one just by operating the exactly one operating lever 18 once.

The at least one amplifier module 10 preferably also comprises a display element. This display element is furthermore preferably composed of one or more LEDs (Light Emitting Diodes). This display element is arranged on a housing surface of the at least one amplifier module 10. The display element is arranged such that it is visible from outside the antenna housing 2. In particular, the display element should be visible when an installer who wants to replace a defective amplifier module 10, observes the mobile antenna 1 on the mast. The at least one amplifier module 10 or the at least one signal processing and/or control unit 9 are then designed to control the display element in such a way that it visually signals a defect of the at least one amplifier module 10. For this purpose, the at least one display element may also comprise a plurality of LEDs which, depending on the state of the amplifier module 10, light up with a different colour. The at least one display element could also be arranged at another position, such as, for example, at the signal processing and/or control unit 9.

With reference to FIGS. 1A and 1B, at least one power supply device 20 is also shown, which abuts one or more side segments $2_1$, $2_2$, 2 of the first or second lateral housing side 2c, 2d. The at least one power supply device 20 supplies power to the signal processing and/or control unit 9 and the at least one amplifier module 10. This supplies the active components. The power supply device 20 is preferably fastened analogously to the mounting of the at least one amplifier module 10. The at least one power supply device 20 also has corresponding connections which may be brought into preferably galvanic electrical contact with corresponding connections within the antenna housing 2 by means of an in particular thread-free and/or screw-free plug-in connection. For this purpose, corresponding openings are also made in the first or second lateral housing side 2c, 2d. The at least one power supply device 20 may also have (exactly) one locking device, as a result of which the power supply device 20 is held more securely on the antenna housing 2. The at least one power supply device 20 is concealed thereby in plan view of the housing front side 2a. In a plan view of the first or second lateral housing side 2c, 2d of the antenna housing 2, the at least one power supply device 20 preferably does not protrude beyond the housing rear side 2b. The at least one power supply device 20 may be supplied with a DC voltage or an AC voltage. It may also output a DC voltage or an AC voltage.

The at least one power supply device 20 may also be plugged into or removed from the antenna housing 2 with a motion vector which runs exclusively perpendicularly to, or has a component predominantly perpendicular to, the first or second lateral housing side 2c, 2d and/or which runs in parallel with, or has a component predominantly parallel to, the reflector plane of the reflector 5. The mobile communications antenna 1 preferably comprises at least two power supply devices 20, which are separate from one another and are accommodated in preferably separate housings. The power supply devices 20 are preferably dimensioned such that in the event of failure of a power supply device 20, the mobile communications antenna 1 may continue to operate without any loss of performance or only with a slightly (<20%) reduced transmission power.

The signal processing and/or control unit 9 rests on one or more of the side segments $2_1$, $2_2$, $2_n$ of the first and/or second lateral side of the housing 2c, 2d and/or on the housing rear side 2b of the antenna housing 2. In plan view of the housing rear side 2b, the signal processing and/or control unit rests on the at least one power supply device 20 and/or completely or at least partially overlaps the same in plan view. The signal processing and/or control unit 9 is connected to corresponding terminals within the antenna housing 2 by a simple plug-in connection. Both the power supply device 20 and the signal processing and/or control unit 9 may preferably be replaced without the use of tools. The signal processing and/or control unit 9 preferably also comprises (exactly) one locking device $2_1$, by which it is additionally fastened to the antenna housing 2. The at least one signal processing and/or control unit 9 may be supplied with a DC voltage, a signal with a DC component or an AC voltage. It may also output a DC voltage, a signal with a DC component or an AC voltage.

In the mounted state of the mobile communications antenna 1, the at least one power supply device 20 and the at least one signal processing and/or control unit 9 are preferably arranged at the bottom end of the mobile communications antenna 1.

With reference to FIG. 1B, it should be noted that the upper four amplifier modules 10 are used, for example, for providing the band 7 and the lower four amplifier modules are used for providing the band 3.

Figure 2:
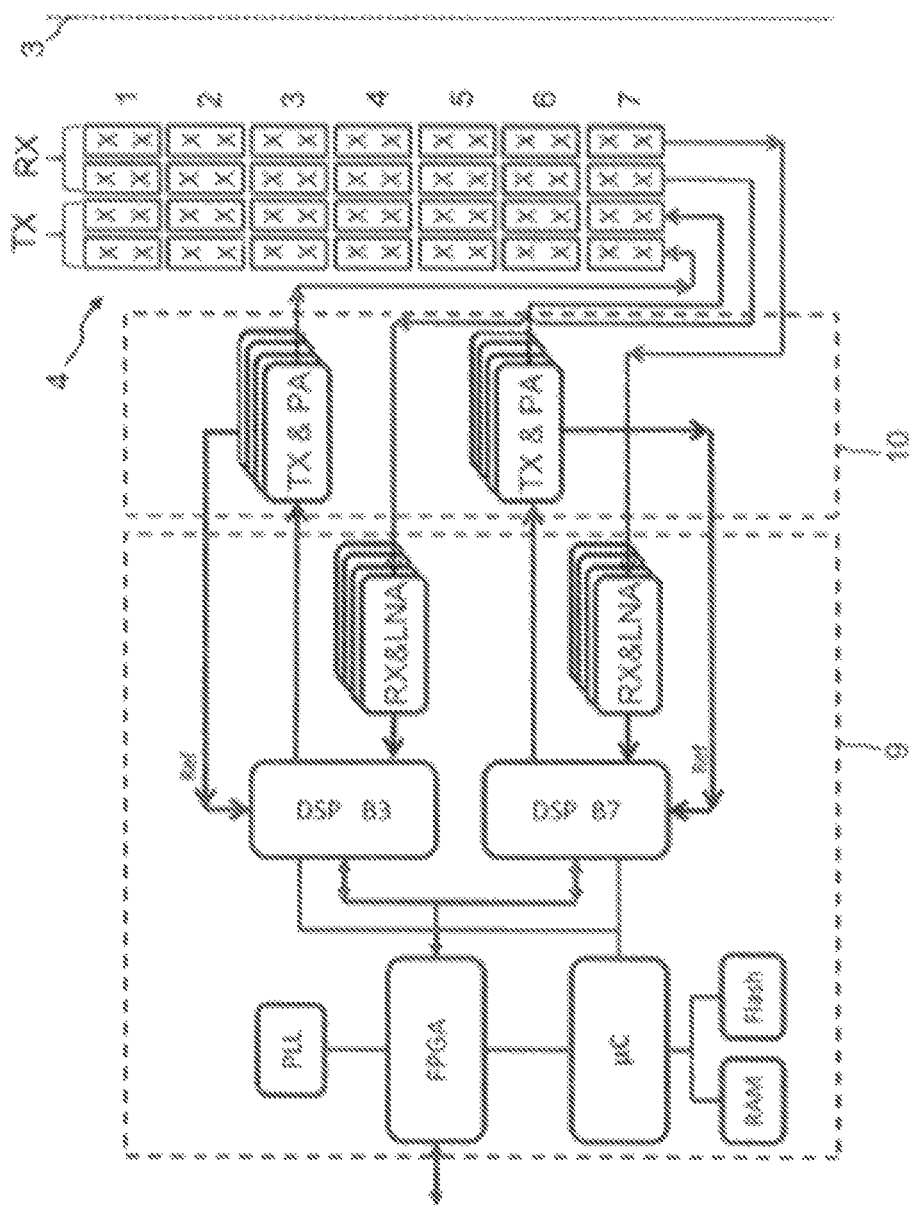
FIG. 2 shows a simplified block diagram detailing the structure of the mobile communications antenna according to the invention.

FIG. 2 shows a simplified block diagram which explains the mode of operation of the mobile communications antenna 1 in more detail. The mobile communications antenna 1 comprises a plurality of radiating elements or radiating element pairs 4, which are arranged spaced apart in front of the reflector 5. The plurality of radiating elements or radiating element pairs 2 are arranged on the reflector front side, which faces in the direction of the housing front side 2a, in at least two columns (four columns are shown in FIG. 2), the columns being parallel to one another and the radiating elements or radiating element pairs 4 in the columns being offset from one another in the direction of the longitudinal axis 3. Overall, in this embodiment, seven radiating elements or radiating element pairs 4 are arranged in each column. More or fewer radiating elements or radiating element pairs 4 may also be formed. Preferably, only radiating elements or radiating element pairs 4 which radiate only one mobile communication signal are arranged in one column, whereas only radiating elements or radiating element pairs 4 which receive only one mobile communication signal are arranged in another column.

In FIG. 2, in the two adjacent columns on the left side, only radiating elements or radiating element pairs 4 which radiate a mobile communication signal are arranged, whereas in the two adjacent columns on the right side, only radiating elements or radiating element pairs 4 which receive a mobile communication signal are arranged. By such separation, the efficiency may be increased because the decoupling by the separate radiating elements or radiating element pairs 4 for the transmission and receiving direction reduce the filter requirements by approximately 25 to 30 dB. As a result, the filters, for example the filter housing 10b, may be made smaller and lighter and with a lower transmission loss, which in turn improves the efficiency and, in turn, minimises the power loss. In a described preferred embodiment, therefore, the filters are integrated directly into the amplifier modules 10. This has the advantage that the size of the amplifier modules 10 required for heating may at the same time be shared with filters, which are typically made of aluminium, for heat spreading and cooling. This makes it easier to adapt the amplifier and the filter. Of course, the filter could also be integrated directly inside the antenna housing 2, so that the amplifier module 10 would consist substantially only of the transmission amplifier unit having an output stage and driver stage, and possibly also of a circulator for decoupling.

By the separation of the radiating elements or radiating element pairs 4, an intermodulation value of −175 to −180 dBc may be achieved. An LTE system requires a theoretical intermodulation value better than −163 dBc. This could not be produced in series in the conventional design. The construction according to the invention also involves a weight reduction of about 40% compared to a conventional solution. The mobile communications antenna may cover different mobile communications standards such as GSM, CDMA, WCDMA, LTE, etc. It is suitable for FDD operation, or TDD operation.

With reference to FIG. 2 it may be seen that only the amplifiers for those radiating elements or radiating element pairs which radiate a mobile communication signal are designed as separate amplifier modules 10.

The radiating elements or radiating element pairs 4 which only receive a mobile communication signal are connected to input amplifiers, which are preferably arranged only within the signal processing and/or control unit 9. In this signal processing and/or control unit 9, the digital signal processors which generate, for example, band 3 and band 7 are then also integrated. The signal processing and/or control unit 9 is connected or connectable via a digital interface (such as an optical fibre) to a base station (not shown) or a mobile network.

FIG. 7 shows a simplified spatial representation of the opened mobile communications antenna 1, whereas FIG. 9 shows a simplified cross section through the mobile communications antenna 1 according to the invention. With reference to FIG. 7, an inner housing device 30 is shown, which is preferably arranged completely inside the antenna housing 2. The inner housing device 30 is arranged on a rear side 5a of the at least one reflector 5 and, together with its two opposite side walls 30a, 30b, its rear wall 30c and the rear side 5a of the reflector 5, forms a receiving space 31. In this receiving space 31 a plurality of phase shifters (not shown) are arranged. By means of this phase shifters, the at least one amplifier module 10 is indirectly connected to the plurality of radiating elements or radiating element pairs 4 for signal transmission.

Furthermore, band-split filters may be arranged in this receiving space 31, whereby the individual columns of the mobile communications antenna 1 are divided between band 3 and band 7 or whereby a block-wise combination of groups of radiating elements may occur for a MIMO operation. In a preferred embodiment, separate passive phase shifters, for example in the form of a dual-band version of passive antennas, are also included for each band and each polarization. Thus, each column would have a separate connection for each band and polarization, resulting in four connections per column, requiring a corresponding number of amplifier modules 10.

In the side walls 30a, 30b of the inner housing device 30, fastening openings 32 are also made, in which at least the second connection contact devices 8b are arranged and/or fastened.

On the rear wall 30c of the inner housing device 30, fastening lugs 33 are formed in the direction of the housing rear side 2b of the antenna housing 2. These are preferably provided in that the rear wall 30c of the inner housing device 30 is punched out to a certain extent, wherein in a bending process the punched-out region (this is only punched out over a maximum of three sides) is bent in the direction of the housing rear side 2b of the antenna housing 2.

In the fastening lugs 33, further fastening openings 34 are made or punched, in which at least the first connection contact devices 8a are arranged and/or fastened.

The inner housing device 30 is mechanically connected by its opposite side walls 30a, 30b to the rear side 5a of the reflector 5 preferably via a screw connection.

Preferably, the connections between the signal processing and/or control unit 9 and the amplifier modules 10 extend in a region between the housing rear side 2b of the antenna housing 2 and a rear wall 30c of the inner housing device 30. Further preferably, the connections between the at least one amplifier module 10 and the radiating elements or radiating element pairs 4 extend between a rear side 5a of the reflector 5 and the inner housing device 30, i.e. within the receiving chamber 31 formed by the inner housing device 30.

As a result, the at least one amplifier module 10 may be connected via its first connection port 12a directly or indirectly via the first connection contact device 8a to the at least one signal processing and/or control unit 9. Conversely, this means that the at least one amplifier module 10 may be connected via its second connection port 12b indirectly or directly via the second connection contact device 8b to at least one radiating element or radiating element pair 4 for signal transmission.

The width (extension runs in particular in parallel with the reflector surface) of the housing rear side 2b is at least 10%, preferably at least 20%, 30%, 40%, 50%, 60%, 70%, 80% or 90%, narrower than the width of the housing front side 2a or the maximum width of the entire antenna housing 2.

The amplifier modules 10 and/or the at least one power supply device 20 and/or the at least one signal processing and/or control unit 9 are preferably arranged on the region of the first and/or second lateral housing side 2c, 2d which has already tapered with respect to the width of the housing front side 2a.

The housing rear side 2b and at least parts of the first and second lateral housing side 2c, 2d of the antenna housing 2 are made of metal or a metal alloy. They may also consist of a plastics material like the housing front side 2a of the antenna housing.

The first and the second connection ports 12a, 12b of the respective amplifier modules 10 are preferably arranged more than 1 cm, more than 2 cm, 3 cm, 4 cm or preferably more than 5 cm apart from each other on the housing of the amplifier module 10.

The first connection port 12a is in particular galvanically connected to the first connection contact device 8a by the plug-in connection. Preferably, an inner conductor of the first connection port 12a is galvanically connected to an inner conductor receiving element in the first connection contact device 8a. The first connection port 12a may also have a plurality of inner conductors which may engage in a plurality of inner conductor receiving elements in the first connection contact device 8a. Of course, the at least one inner conductor could also be formed in the first connection contact device 8a and galvanically connected to at least one inner conductor receiving element in the first connection port 12a. The same may also apply to the second connection port 12b in conjunction with the second connection contact device 8b.

The invention is not limited to the described embodiments. In the context of the invention, all features described and/or illustrated may be combined with one another as desired.

Different embodiments of the invention will be described in the following separately.

In one aspect of the present invention, the mobile communications antenna 1 comprises the following features:
   the connection openings 7a, 7b at which at least one of the amplifier modules 10 engages or is in contact are positioned at mutually adjacent side segments $2_1$, $2_2$, $2_n$ of the first or second lateral housing side 2c, 2d; or
   the connection openings 7a, 7b at which at least one of the amplifier modules 10 engages or is in contact are arranged on side segments $2_1$, $2_n$ of the first or second lateral housing side 2c, 2d that are spaced from each other by at least one further side segment $2_2$.

In another aspect of the present invention, the mobile communications antenna 1 comprises the following features:
   the first connection port 12a and the second connection port 12b of at least one of the amplifier modules 10 extend through the connection openings 7a, 7b into the antenna housing 2 and are connected therein to the corresponding first and second connection contact devices 8a, 8b by the plug-in connection; or
   the first connection port 12a and the second connection port 12b of at least one of the amplifier modules 10 are connected to the first and second connection contact devices 8a, 8b by a plug-in connection, wherein the first and second connection contact devices 8a, 8b extend through connection openings 7a, 7b from within the antenna housing 2 to outside the antenna housing 2.

In a further aspect of the present invention, the mobile communications antenna 1 comprises the following features:
   the first and/or the second connection port 12a, 12b of at least one of the amplifier modules 10 is provided with a scaling device which seals the respective connection opening 7a, 7b; and/or
   the first and/or the second connection contact device 8a, 8b is provided with a sealing device which seals the respective connection opening 7a, 7b.

In another aspect of the present invention, the mobile communications antenna 1 comprises the following features:
   fastening lugs 33 are formed on the rear wall 30c of the inner housing device 30 in the direction of the housing rear side 2b of the antenna housing 2;
   a distance between two approximately opposite fastening lugs 33 is smaller than a distance between the two side walls 30a, 30b of the inner housing device 30;
   in the fastening lugs 33 further fastening openings 34 are made, in which at least the first connection contact devices 8a are arranged and/or fastened.

In one aspect of the present invention, the mobile communications antenna 1 comprises the following features:
   the amplifier housing 10a and the filter housing 10b of at least one amplifier module 10 consist of or comprise metal or a metal alloy;
   the amplifier housing 10a and the filter housing 10b consist of a common milled and/or cast part;
   or
   the amplifier housing 10a and the filter housing 10b consist of separately formed milled and/or cast parts and are connected to each other via a mechanical connection, in particular a screw connection;
   the first connection port 12a is arranged on the amplifier housing 10a and the second connection port 12b is arranged on the filter housing 10b.

In a further aspect of the present invention, the mobile communications antenna 1 comprises the following features:

the amplifier housing 10a is aligned with its longer side perpendicular to, or with a component predominantly perpendicular to, the longitudinal axis 3;

the filter housing 10b is aligned with its longer side parallel to, or with a component predominantly parallel to, the longitudinal axis 3.

In another aspect of the present invention, the mobile communications antenna 1 comprises the following features:

at least one of the amplifier modules 10 comprises cooling ribs 16 which are fastened to those housing surfaces of the amplifier module 10 which are parallel to the housing front side 2a or housing rear side 2b of the antenna housing 2;

the cooling ribs 16 run in parallel with, or with a component predominantly parallel to, the longitudinal axis 3; and/or air gaps are formed between the cooling ribs 16 and run in parallel with, or with a component predominantly parallel to, the longitudinal axis 3; and/or at least one of the amplifier modules 10 comprises an active cooling device, in particular in the form of a fan.

In one aspect of the present invention, the mobile communications antenna 1 comprises the following feature:

the width of the rear of the housing 2b is at least 10%, preferably at least 20%, 30%, 40%, 50%, 60%, 70%, 80% or 90%, narrower than the width of the housing front side 2a or the maximum width of the entire antenna housing 2.

The invention claimed is:

1. A mobile communications antenna for mounting on a mast-like or wall-like support with at least two interchangeable amplifier modules, comprising:

at least one antenna housing with a housing front side, a housing rear side and a first lateral housing side and a second lateral housing side opposite to the first housing side, which together form an enveloping housing wall, wherein the antenna housing extends along a longitudinal axis;

in the antenna housing, a plurality of radiating elements or radiating element pairs are positioned spaced apart in front of at least one reflector;

at least two amplifier modules, with a respective first connection port and a second connection port;

the amplifier modules being fastened to or mounted on the exterior of the antenna housing, at the housing rear side and/or at the first or second lateral housing side;

at least one signal processing and/or control unit; the at least one signal processing and/or control unit disposed in a housing, which is separate from the amplifier modules, in or on the antenna housing of the mobile communications antenna;

the at least one signal processing and/or control unit comprising at least one digital interface to a baseband unit or to the mobile communications network and which interfaces to the separate amplifier modules;

the first connection port and the second connection port of the at least two amplifier modules being connected via associated connection openings in the antenna housing to associated first and second connection contact devices via a plug-in connection;

wherein in a plan view of a cross section through the antenna housing the first and/or the second lateral housing side extend, in at least one portion, from the housing front side to the housing rear side with a component directed towards the opposite lateral housing side, whereby the housing rear side has a smaller width than the housing front side; and wherein the at least two connection openings for each of the at least two amplifier modules are arranged on two different side segments of the first and/or second lateral housing side.

2. The mobile communications antenna of claim 1, wherein:

the first connection port is galvanically connected to the first connection contact device via the plug-in connection and/or the second connection port is galvanically connected to the second connection contact device via the plug-in connection;

or the first connection port has one or more inner conductors, which are galvanically connected to an inner conductor receiving element or a plurality of inner conductor receiving elements in the first connection contact device; or the first connection port has an inner conductor receiving element or a plurality of inner conductor receiving elements, which are galvanically connected to an inner conductor or a plurality of inner conductors in the first connection contact device;

and/or the second connection port has one or more inner conductors, which are galvanically connected to an inner conductor receiving element or a plurality of inner conductor receiving elements in the second connection contact device; or the second connection port has an inner conductor receiving element or a plurality of inner conductor receiving elements, which are galvanically connected to an inner conductor or a plurality of inner conductors in the second connection contact device.

3. The mobile communications antenna according to claim 1, wherein: a DC voltage and or a signal with a DC voltage component is transmittable via the first and/or second connection port of the at least two amplifier modules to the respective first and/or second connection contact device.

4. The mobile communications antenna according to claim 1, wherein:

in plan view of a cross section through the antenna housing, the first and/or the second lateral housing side are step-shaped and each includes n side segments with n≥2 or n≥3;

the first side segment of the first and/or second lateral housing side adjoins the housing front side, and the nth side segment of the first and the second lateral housing side adjoins the housing rear side;

a distance between the respective side segments of the first and second lateral housing sides decreases gradually from the first side segment to the nth side segment;

the first and/or second lateral housing side have, on two different side segments, for the at least one amplifier module the at least two connection openings, with the associated first and second connection contact devices.

5. The mobile communications antenna according to claim 1, wherein:

the at least two amplifier modules are indirectly or directly connected via their first connection port via the respective first connection contact device to the at least one signal processing and/or control unit for signal transmission;

the at least two amplifier modules are connected via their second connection port indirectly or directly via the respective second connection contact device to at least one radiating element or radiating element pair for signal transmission.

6. The mobile communications antenna according to claim 1, further including:
a plurality of phase shifters, wherein at least one of the amplifier modules is indirectly connected via at least one phase shifter to a plurality of radiating elements or radiating element pairs for signal transmission;
an inner housing device which is disposed within the antenna housing;
the inner housing device being arranged on a rear side of the at least one reflector and forming, together with its two opposite side walls, its rear wall and the rear side of the reflector, a receiving space;
the phase shifters being arranged in this receiving space.

7. The mobile communications antenna according to claim 6, wherein:
fastening openings are made in the side walls of the inner housing device, in which openings at least the second connection contact devices are arranged and/or fastened.

8. The mobile communications antenna according to claim 1, wherein:
at least one of the amplifier modules forms a transmission amplifier which amplifies mobile communication signals which are transmitted via the radiating elements or radiating element pairs; and/or
at least one of the amplifier modules forms a receiver amplifier which amplifies mobile communication signals received via the radiating elements or radiating element pairs;
or
at least one receiving amplifier is integrated in the signal processing and/or control unit for amplifying the mobile communication signals received via the radiating elements or radiating element pairs.

9. The mobile communications antenna according to claim 1, wherein:
at least one of the amplifier modules may be plugged into or removed from the antenna housing when viewed towards the first and/or the second lateral housing side;
the first or the second connection port of at least one of the amplifier modules is arranged in the insertion direction in front of the second or first connection port.

10. The mobile communications antenna according to claim 9, wherein:
the first or second connection port of at least one amplifier module is arranged closer to or at the same distance from the housing front side than or as the second or first connection port of the at least one amplifier module; and/or
the first and the second connection port of at least one amplifier module are offset from each other in the direction of the longitudinal axis.

11. The mobile communications antenna according to claim 1, wherein:
at least one of the amplifier modules comprises an amplifier housing and a filter housing;
a power amplifier is arranged in the amplifier housing;
a high-frequency filter, in particular a high-frequency filter with a cavity design, is arranged in the filter housing;
the filter housing and the amplifier housing are interconnected or coupled together for signal transmission via a signal line.

12. The mobile communications antenna according to claim 11, wherein:
the at least one amplifier module is L-shaped;
and/or
the at least one amplifier module is pluggable into or removable from the antenna housing with a motion vector which is exclusively perpendicular to, or has a component predominantly perpendicular to, the first or second lateral housing side and/or which is parallel to, or has a component predominantly parallel to the reflector plane; and/or
in a plan view on the housing front side of the antenna housing, the at least one amplifier module in the mounted state is predominantly or completely covered by the housing front side.

13. The mobile communications antenna according to claim 1, wherein:
at least one of the amplifier modules comprises a locking device which is fastened thereto;
in the mounted state, the locking device engages in a locking opening which is formed in the first or second lateral housing side and prevents the at least one amplifier module from being removed without actuation of the locking device.

14. The mobile communications antenna according to claim 1, wherein:
at least one of the amplifier modules comprises a display element, in particular in the form of an LED;
the display element is visible from outside the antenna housing;
the at least one amplifier module or the at least one signal processing and/or control unit is adapted to control the display element such that it visually signals a defect of the at least one amplifier module.

15. The mobile communications antenna according to claim 1, wherein:
the mobile communications antenna comprises more than two amplifier modules;
the amplifier modules are positioned spaced apart along the longitudinal axis on the first lateral housing side and on the second lateral housing side.

16. The mobile communications antenna according to claim 1, further comprising:
at least one power supply device, wherein the at least one power supply device rests on one or more side segments of the first or second lateral housing side; and/or
the signal processing and/or control unit rests on one or more side segments of the first and/or second lateral housing side and/or on the housing rear side of the antenna housing.

17. The mobile communications antenna according to claim 16, wherein:
the at least one power supply device is pluggable into or is removable from the antenna housing with a motion vector which is exclusively perpendicular to, or has a component predominantly perpendicular to, the first or second lateral housing side and/or or which is parallel to, or has a component predominantly parallel to, the reflector plane; and/or
the signal processing and/or control unit rests, in plan view of the housing rear side, on the at least one power supply device and/or overlaps the same completely or at least partially; and/or in the assembled state of the mobile communications antenna, the at least one power supply device and the at least one signal processing and/or control unit are arranged at the end of the mobile communications antenna which is oriented closer to the ground.

18. The mobile communications antenna according to claim 1, wherein:

the plurality of radiating elements or radiating element pairs are arranged on the reflector front side in at least two columns, wherein the columns are arranged in parallel with each other and the radiating elements or radiating element pairs are disposed in the columns offset from one another in the direction of the longitudinal axis;

in one column, radiating elements or radiating element pairs which radiate only one or predominantly only one mobile communication signal are arranged, whereas in another column, radiating elements or radiating element pairs which only or predominantly only receive a mobile communication signal are arranged.

19. The mobile communications antenna according to claim 1, wherein:

at least two amplifier modules for each band are arranged on the antenna housing in housings which are separate therefrom.

* * * * *